(12) United States Patent
Underhill

(10) Patent No.: US 6,722,100 B1
(45) Date of Patent: Apr. 20, 2004

(54) SIMPLIFIED WRAP MATERIAL DISPENSER FOR CROP BALES

(75) Inventor: Kenneth R. Underhill, Strasburg, PA (US)

(73) Assignee: New Holland North America, Inc., New Holland, PA (US)

(*) Notice: Subject to any disclaimer, the term of this patent is extended or adjusted under 35 U.S.C. 154(b) by 0 days.

(21) Appl. No.: 10/426,491

(22) Filed: Apr. 30, 2003

(51) Int. Cl.[7] ............... B65B 63/04; A01F 15/07; A01F 15/08
(52) U.S. Cl. ............... 53/118; 53/587; 53/389.3
(58) Field of Search ............... 53/118, 587, 389.3; 56/341; 100/5, 13, 89

(56) References Cited

U.S. PATENT DOCUMENTS

| | | | |
|---|---|---|---|
| 4,729,213 A | 3/1988 | Raes | |
| 4,956,968 A | 9/1990 | Underhill | |
| 5,230,193 A | 7/1993 | Underhill et al. | |
| 5,259,167 A | * 11/1993 | Underhill et al. | 53/118 |
| 5,479,767 A | * 1/1996 | McClure et al. | 53/118 |
| 5,568,716 A | 10/1996 | Kluver et al. | |
| 5,581,973 A | * 12/1996 | Underhill | 53/118 |
| 5,581,974 A | * 12/1996 | Underhill et al. | 53/118 |
| 5,687,548 A | * 11/1997 | McClure et al. | 53/118 |
| 6,021,622 A | * 2/2000 | Underhill | 53/118 |
| 6,446,548 B2 | * 9/2002 | Chow | 53/587 |
| 6,550,218 B2 | * 4/2003 | McClure et al. | 53/118 |

* cited by examiner

Primary Examiner—Stephen F. Gerrity
(74) Attorney, Agent, or Firm—John William Stader; Collin A. Webb

(57) ABSTRACT

An agricultural baler for making cylindrical bales of crop material has a sledge assembly moveable between bale starting and full bale positions. The sledge assembly includes a plurality of rollers which cooperate with an apron to define a bale forming chamber. A mechanism is linked directly to and moves with the sledge assembly for dispensing sheet material into the bale forming chamber where it is wrapped around a cylindrical bale of crop material. A simple assembly operated by an actuator piston that moves with the sledge rollers is used to initially feed the wrap material between the sledge rollers and the crop material and then to withdraw the dispenser when the bale is wrapped while simultaneously cutting the wrap material from its feed roll.

2 Claims, 4 Drawing Sheets

SIMPLIFIED WRAP MATERIAL DISPENSER FOR CROP BALES

BACKGROUND OF THE INVENTION

This invention relates generally to a baler for forming cylindrical bales of crop material, commonly referred to as a round baler. More particularly, this invention pertains to a round bale wrapping apparatus having a simplified wrap material dispensing mechanism. Balers of this type generally have a bale forming chamber defined by an apron comprising an array of side-by-side belts, transverse slats mounted on chains, a plurality of rolls or a combination of these various elements, e.g., rolls and belts. Crop material, such as hay, is picked up from the ground as the baler traverses the field, and it is fed into a flexed or adjustable chamber where it is rolled up to form a compact cylindrical bale. The formed bale is wrapped in its compacted form by plastic film, net, twine or the like while still inside the bale forming chamber, and it is then ejected from the chamber onto the ground for subsequent handling.

Examples of prior art round balers of the general type mentioned above are the balers disclosed in U.S. Pat. No. 4,956,968 and U.S. Pat. No. 5,230,193 issued in the name of K. R. Underhill on Sep. 18, 1990 and Jul. 27, 1993, respectively. These balers include a mechanism for dispensing a net wrapping material into a bale forming chamber to circumferentially wrap a formed cylindrical bale. In both of these patents unique wrap material clamping arrangements are provided for inserting the loose end, the tail, of the wrap material into the chamber when the wrapping operation begins. In wrapping systems of this type it is crucial to good bale formation for the material to be wrapped snugly around the crop material and also to be evenly spread across the full width of the bale for substantially the full width.

However, the prior art wrap insertion and cutting mechanisms have been very complicated and were constructed using multiple (as many as ten) complicated rod linkages forming pivoted and sliding levers to insert the wrap material into a location from which it is carried around the bale. The need to cut the wrap material and the requirement to withdraw the wrap material insertion mechanism before starting a new bale required additional complicated lever actions. It would be very beneficial to have a less complicated wrapping mechanism both for the construction economy of requiring fewer parts to make and assemble the mechanism, and for the simplified maintenance requirements.

SUMMARY OF THE INVENTION

The present invention provides a simpler wrap feeding mechanism capable of feeding either net or film wrap, that uses the same shearbar knife as the prior art, wraps any size bale, and also allows less trash leakage than prior art wrap material feed systems.

The wrap material feeding mechanism of the invention is used with a conventional prior art round baler that has a main frame, a tailgate pivotally connected to the main frame and a sledge assembly mounted on the main frame for movement between a bale starting position and a full bale position. The sledge. assembly includes a plurality of rollers extending transversely across the main frame. The baler further includes an apron movably supported along a continuous path on the main frame and; on the tailgate with an inner course that cooperates with the rollers of the sledge assembly to define a bale forming chamber. The wrap material feeding mechanism of the invention is attached to the sledge assembly for dispensing sheet material into the bale forming chamber in a manner whereby the sheet material is wrapped around the curved sides of a cylindrical bale of crop material while the bale is in the bale forming chamber.

In the present invention, the knife and the wrap material feed mechanism, referred to as a "duckbill" because of its resemblance to the beak of a duck, are mounted on a floating cam arm that is linked to and moves with and in a plane parallel to the sledge arm that supports and moves the sledge rollers. Since the sledge arm moves with the sledge rollers as the bale grows, the floating cam arm, the duckbill, and the wrap material knife also move with the sledge rollers. This places the duckbill and the knife in the appropriate position relative to the bale, whether it is a full or partial bale, to begin the wrapping procedure at any time. All that is necessary is a single motion to insert the wrap material feeding mechanism, the duckbill, between two of the sledge rollers. From that location the tail of the wrap material, the cut section extending from the duckbill, is picked up by pinching it between the rotating lower sledge roller and the bulging bale, and the wrapping of the bale begins.

When the wrapping is completed, the motion of the duckbill is reversed and it is withdrawn from between the sledge rollers. This reverse motion is linked to and is accompanied by a simple motion of the wrap material cutting knife that moves the knife into contact with and cuts the wrap material. Since before the cut, the wrap material is held tautly between the wrapped bale and the retreating duckbill, the knife, which hits the wrap material approximately midway between the duckbill and the bale, easily cuts the material and leaves sufficient tail to begin the wrapping process when the duckbill is again inserted between the sledge rollers.

The simple motions that are required to first insert the duckbill between the sledge rollers and move the knife away from the wrap material, and then to withdraw the duckbill from the sledge rollers and move the knife to the wrap material and cut the material is accomplished by a single piston mounted on the floating cam arm. This piston produces a single motion by extending to insert the duckbill between the sledge rollers, and the piston withdraws to remove the duckbill from between the sledge rollers. The motion of the knife is accomplished by a single linking arm between the duckbill arm and the knife arm.

The present invention thereby accomplishes all the actions required to initiate and terminate the wrapping and to properly cut the wrapping material, and it does so with only four linked parts and an actuating piston, along with the prior art duckbill and shearbar knife.

DESCRIPTION OF THE PREFERRED EMBODIMENT

Figure 1:
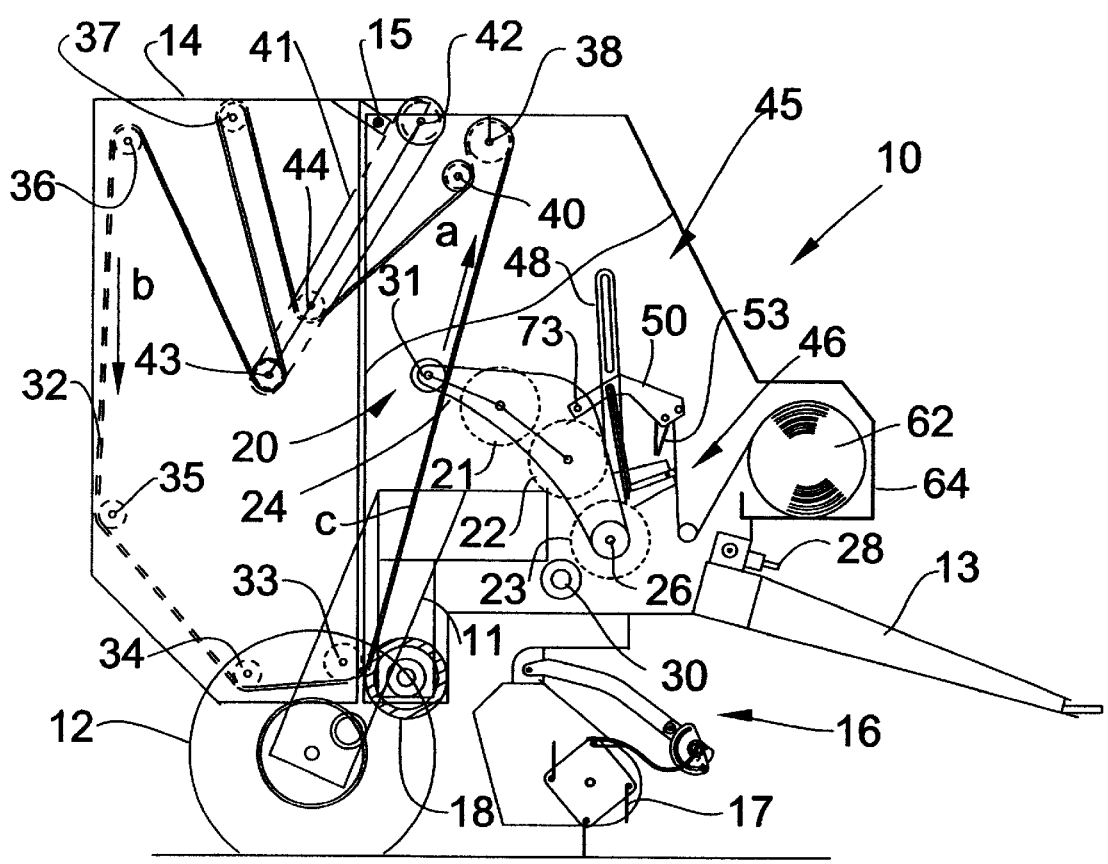
FIG. 1 is a side elevation view of a round baler in which the present invention is embodied showing the elements in the bale starting position.

Referring now to the drawings for a more detailed description of the preferred embodiment of the invention, FIG. 1 shows an expandable chamber round baler 10 similar to the type disclosed in U.S. Pat. No. 4,956,968 issued on Sep. 18,1990 in the name of K. R. Underhill. As will become apparent from the detailed description below, the present invention is directed to an improvement to the wrap material dispensing system employed in balers of this nature, so that FIG. 1 differs from the prior art patent in the structure of the wrap material dispensing mechanism.

Round baler 10 incorporates the preferred embodiment of the wrap material wrapping apparatus of the invention and includes a main frame 11 supported by a pair of wheels 12 (only one shown) mounted generally in a well known side-by-side fashion. A tongue 13 is provided on the forward portion of main frame 11 for connection to a tractor (not shown). A tailgate 14 is pivotally connected to the sides of main frame 11 by a pair of stub shafts 15 so that tailgate 14 may be closed as shown in FIG. 1 during bale formation or pivoted open about stub shafts 15 to discharge a completed bale. Pickup 16 includes a plurality of fingers or tines 17 movable in a predetermined path to lift crop material from the ground and deliver it rearwardly toward a floor roll 18 which is rotatably mounted on main frame 11.

Figure 2:
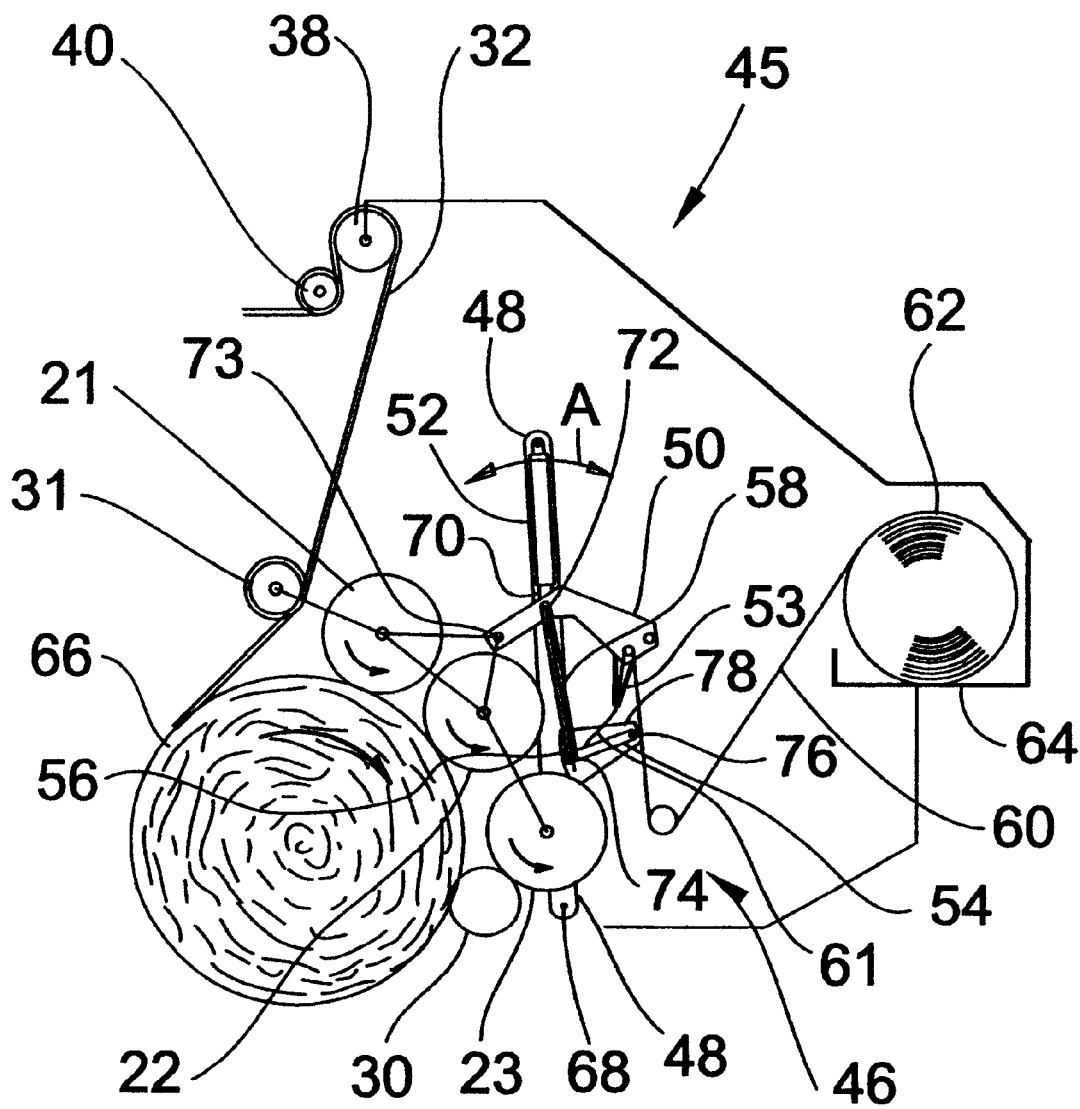
FIG. 2 is an enlarged schematic side view of the elements of the present invention in the position at the early stage of the formation of the bale.
Figure 3:
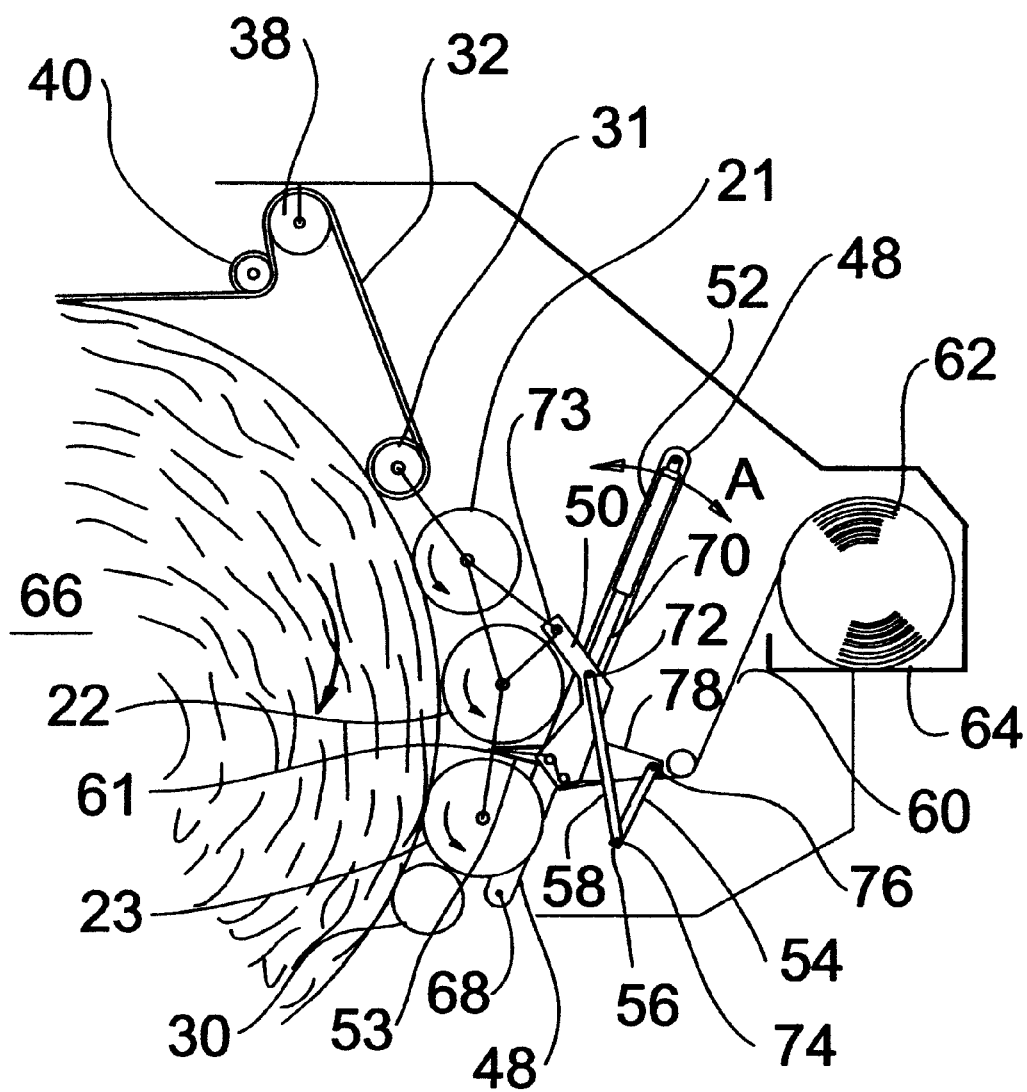
FIG. 3 is an enlarged schematic side view of the elements of the present invention in the position of inserting the wrap material into the bale forming chamber to begin the action of wrapping the bale.
Figure 4:
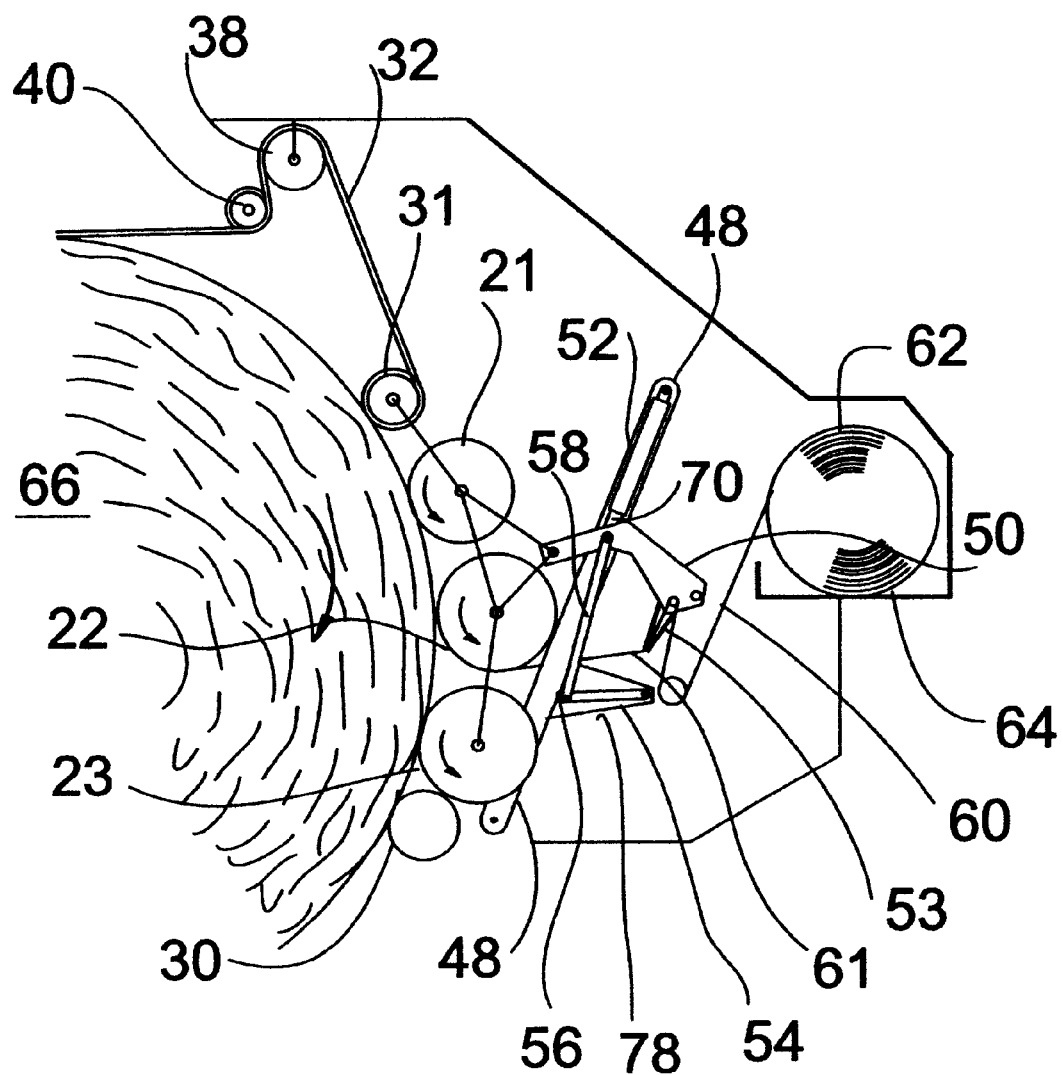
FIG. 4 is an enlarged schematic side view of the elements of the present invention in the position in which the wrap material feeding mechanism has been withdrawn from the bale forming chamber and has cut the wrap material free from a fully wrapped bale.

The bale forming chamber is formed partly by a sledge assembly 20 which includes a plurality of rollers 21, 22, 23 extending transversely across the main frame 11 in the arcuate arrangement seen in FIG. 1 Rollers 21, 22, 23 are journalled at their respective ends in a pair of spaced apart roll carrying arms, only one of which, 24, is seen in FIG. 1. These arms 24 are pivotally mounted inside main frame 11 on stub shafts 26 for providing movement of sledge assembly 20 between a bale starting position shown in FIG. 1 and a full bale position shown in FIGS. 3 and 4. Rollers 21, 22, 23 are driven in counter-clockwise direction as viewed in FIGS. 1–4 by conventional means (for example, chains and sprockets or gears) connected with a drive shaft 28 which is adapted for connection to the power take off of a tractor (not shown). A starter roll 30 is located adjacent to roller 23 and is also driven in counter-clockwise direction, as viewed in FIG. 1. An idler 31 is carried by arms 24 for movement in an arcuate path with sledge assembly 20 as it moves between its bale starting position (FIG. 1) and full bale position (FIGS. 3 and 4). Idler roller 31 rotates freely.

A conventional apron. 32 includes a plurality of continuous side-by-side belts supported by guide rolls 33, 34, 35, 36, 37 which are rotatably mounted in tailgate 14. Apron 32 is also supported on a drive roll 38 which is rotatably mounted on main frame 11. Although apron 32 passes between roller 23 on sledge assembly and idler roller 31, it is only in engagement with idler roller 31 and not roller 21 which is located in close proximity to the apron belts for the purpose of striping crop material from the belts. Further conventional means (not shown) are connected with drive shaft 28 to provide rotation of drive roll 38 by means of coupling with the drive shaft 28 to provide rotation of drive roll 38 in a direction causing movement of apron 32 along its path in a direction indicated by arrows a and b in FIG. 1. An additional guide roll 40 in the main frame 11 ensures proper driving engagement between apron 32 and drive roll 38. A pair of take up arms 41 (only one shown) are pivotally mounted on main frame. 11 by a cross shaft 42 for movement between an inner position shown in FIG. 1 and an outer position when a full size bale is in the chamber and take up arms 41 are essentially parallel to the top of tailgate 14. Take up arms 41 carry additional guide rolls 43 and 44 for supporting apron 32. Resilient means such as coil springs (not shown) are provided to normally urge take up arms toward their inner positions (FIG. 1) while resisting their movement from various inner positions during the bale forming process.

When the elements of round baler 10 are in the positions shown in FIG. 1 with tailgate 14 closed, an inner course C of apron 32 extends between lower front guide roll 33 and idler roll 31 to cooperate with rollers 21, 22, 23 on sledge assembly 20 to define the initial bale forming chamber, or as sometimes referred to, the core starting chamber. The apron inner course, referred to above, forms the rear wall of the chamber while the inwardly facing moving peripheral surfaces of rollers 21, 22, 23 define a cooperating front boundary of the bale forming chamber. Floor roll 18 is disposed in the bottom of the chamber between the front and rear walls thereof and starter roller 30 is spaced from floor roll 18 to form a throat or inlet for the chamber, through which crop material is fed.

As round baler 10 is towed across a field by a tractor, pickup tines 17 lift crop material from the ground and deliver it through the throat formed between floor roll roll and roller 30 and thence into the bale forming chamber of baler 10. The crop material is carried rearward by floor roll 18 and then into engagement with inner course C of the apron which moves it upward and forward into engagement with rollers 21, 22, 23. In this manner the crop material is coiled in a generally clockwise direction as viewed in FIG. 1 to start a bale core. Continued feeding of crop material into the bale forming chamber by pickup tines 17 causes the apron inner course C to expand in length around a portion of the circumference of the bale core as the diameter of the bale increases. Take up arms 41 rotate from their inner position shown in FIG. 1 toward their outer position parallel to the top of tailgate 14 to provide for expansion of the inner course of the apron in a well known manner. Essentially, the outer course of the belts of apron 32 are reduced in length while the inner courses increase by an equivalent amount.

When a bale has been formed and then wrapped with wrap material such as net or plastic sheet, tailgate 14 is opened by conventional means (for example, hydraulic cylinders) and the bale is ejected toward the rear. Subsequent closing of tailgate 14 returns the apron inner and outer courses of the belts of apron 32 to the locations shown in FIG. 1, and round baler 10 is ready to form another bale.

It should be understood that during formation of a bale, sledge assembly 20 also moves between a bale starting position (FIG. 1) to a full bale position (FIGS. 3 and 4). This movement of sledge assembly 20 causes idler roller 31 to move in an arcuate path while maintaining apron 32 in close proximity to roller 21, thereby allowing roller 21 to strip crop material from the belts of apron 32 and prevent or significantly reduce the loss of crop material between roller 31 and apron 32 during formation of a bale. Sledge assembly 20 is pushed outwardly towards its full bale position during bale formation as the crop material expands against the rollers and sledge assembly 20 is pulled inwardly to the home position shown in FIG. 1 during bale ejection without utilizing any additional mechanisms.

In other embodiments of round baler 10 which are not shown, apron 32 can comprise a pair of chains connected together at spaced intervals by transverse slats, and idler roller 31 would be replaced by a pair of idler sprockets engaged with the chains. Aprons consisting of chains and slats are well known in the art as substitutes for side-by-side belt aprons. In such alternative embodiments the guide rolls would also be replaced with guide sprockets for engaging the apron chains, and drive roll 38 would be replaced by a pair of drive sprockets.

The bale wrapping system of the present invention is shown in FIG. 1 which is a side view of a round baler in which the present invention is embodied, and the elements are shown in the bale starting position. FIG. 1 shows wrap material dispensing assembly 45 pivotally mounted on sledge assembly 20 and interrelated web material cutting assembly 46 pivotally mounted between the side walls on main frame 11. The structure and operation of web material dispensing assembly 45 and web material cutting assembly 46 are best understood with reference to FIGS. 2, 3, and 4, all of which are enlarged schematic side views of assemblies 45 and 46 and show the relation of the assemblies to only the sledge rollers. In FIGS. 2, 3, and 4 sledge rollers 21, 22, and 23 are also shown only with schematic lines interconnecting their rotational axes, so that roll carrying arm 24 (FIG. 1) can be omitted to better view the operating parts of assemblies 45 and 46. The location of wrap material dispensing assembly 45 and wrap material cutting assembly 46 relative to other parts of the round baler are shown only in FIG. 1

As seen in FIG. 2, dispensing assembly 45 includes floating cam arm 48 upon which is mounted piston 52 that moves duckbill arm 50 and duckbill wrap material dispenser 53. Cutting assembly 46 includes only knife arm 54, shearbar knife 56, and knife drive link 58. It is this minimum number of parts that provides the beneficial simplicity of the present invention.

Duckbill wrap material dispenser 53 is of conventional construction which is well established in the art. Duckbill dispenser 53 is constructed with upper and lower clamping members that form a structure that, in cross section, resembles a duck's beak, and the clamping members are arranged to dispense sheet wrap material 60 such as net or plastic from between their contacting surfaces and into the bale forming chamber. Wrap material 60 is supplied from roll 62 that is conventionally held in a container 64 carried on the baler main frame 11. The clamping members of duckbill dispenser 53 are mounted by any conventional means that extends across the width of the baler.

FIG. 2 is an enlarged schematic side view of the parts of the present invention in their positions at the early stage of the formation of the bale. At this stage of operation bale 66 has just begun to be formed and both wrap material dispensing assembly 45 and wrap material cutting assembly 46 are normally not needed. However, it should be appreciated that the present invention has no restrictions on bale size, and if it were necessary, small bale 66 could be wrapped in the same manner as will later be described in reference to the larger bales shown in FIGS. 3 and 4.

FIG. 2 does, however, clearly show the various parts of the invention in their positions for early bale formation. Activating piston 52 is mounted upon floating cam arm 48, and floating cam arm 48 pivots around pivot point 68, which is attached to main frame 11. Floating cam arm 48 pivots in a plane parallel to the movement of roll carrying arm 24 and the sledge rollers and is moveable in the path shown by arc A. Piston 52 is oriented so that its extensible end 70 moves in a path that is essentially a radius of the curve of arc A. Duckbill arm 50 is attached to extensible piston end 70 of piston 52 at pivot point 72. Knife drive link 58 is also attached to extensible piston end 70 at pivot point 72, so that when piston end 70 is extended by activating piston 52, duckbill arm 50 and knife drive link 58 move downward with pivot point 72 from their positions shown in FIG. 2 to their positions shown in FIG. 3. This motion of pivot point 72 thereby provides motion to both duckbill dispenser 53 and, by means of pivot points 74 and 76, to shearbar knife 56. FIG. 2 also clearly shows loose end 61 of wrap material 60 protruding from duckbill 53. This loose end 61 will later be inserted between rollers 22 and 23 to begin the bale wrapping action.

The result of the action of piston 52 in moving pivot point 72 is shown in FIG. 3. However, another motion is shown as having already been completed in FIG. 3. As bale 66 increased in size it pushed sledge rollers 21, 22, and 23 clockwise which is the conventional action on round balers. However, in the present invention, the motion of the sledge rollers causes wrap material dispensing assembly 45 and wrap material cutting assembly 46 to follow in the same arc A because duckbill arm 50 is attached to the sledge rollers at pivot point 73. This attachment is also seen in FIG. 1 where pivot point 73 is shown on roll carrying arm 24. There is a significant advantage in piston 52 and wrap material dispensing and cutting assemblies 45 and 46 being directly linked to the sledge rollers because the action of piston 52 then does not have to accommodate to the different locations of the sledge rollers. Piston 52 and wrap material dispensing assembly 45 and wrap material cutting assembly 46 always have the same positions and distances relative to the sledge rollers, so that the assemblies need only to provide the motion for their own dispensing and cutting actions regardless of the position of the sledge rollers.

The dispensing and cutting actions of material dispensing assembly 45 and wrap material cutting assembly 46 are most easily understood by comparing FIG. 2 or FIG. 4, which are quite similar, to FIG. 3. Both FIG. 2 and FIG. 4 show duckbill wrap material dispenser 53 withdrawn from between sledge rollers 22 and 23 because piston 52 is not extended. Furthermore, shearbar knife 56 is shown in its raised position in FIG. 2 and FIG. 4, where it has previously cut end 61 of wrap material 60 (FIG. 2) or has just performed the cutting operation (FIG. 4).

On the other hand, FIG. 3 shows duckbill dispenser 53 inserted between rollers 22 and 23 where wrap material end 61 can be picked up between bale 66 and sledge roller 23 by their rotation and then pulled around the bale by its rotation. The placement of duckbill dispenser 53 between the sledge rollers is accomplished by the simple action of activating piston 52 to extend extensible piston end 70 along floating cam arm 48. The movement of piston end 70 rotates duckbill arm 50 around pivot point 73 that is fixed relative to the sledge rollers, so that duckbill dispenser 53 rotates into position between sledge rollers 22 and 23.

The extension of extensible piston end 70 also lowers shearbar knife 56 to move it away from wrap material 60. This occurs because knife drive link 58 is also attached to extensible piston end 70 at pivot point 72 and to knife arm 54 at pivot point 74 in proximity to shearbar knife 56. Since knife arm 54 is also attached to lateral extension 78 of floating cam arm 48 at pivot point 76, the motion of piston end 70 pushes knife drive link 58 down and rotates knife arm 54 and shearbar knife 56 around pivot point 76 to move shearbar knife 56 away from wrap material 60. Thus, shearbar knife 56 is moved out of the path of duckbill dispenser 53 and away from wrap material 60 just as duckbill dispenser 53 is moved into the bale forming chamber. The starting point of these actions is essentially shown in FIG. 2 in which duckbill dispenser 53 and shearbar knife 56 are located in their positions before duckbill dispenser 53 is inserted between the sledge rollers. The end point of these actions is shown in FIG. 3 in which duckbill dispenser 53 and shearbar knife 56 are located in their positions after duckbill dispenser 53 is inserted between the sledge rollers.

FIG. 4 is an enlarged schematic side view of the elements of the present invention in the position in which the wrap material dispensing assembly 45 has been withdrawn from the bale forming chamber and wrap material cutting assembly 46 has just cut wrap material 60 free from fully wrapped bale 66, but wrap material loose end 61 has not yet fallen away from shearbar knife 56. At this time the round baler is ready to eject the wrapped bale. Once the bale is ejected, web material dispensing assembly 45 and web material cutting assembly 46 of the invention will return to the status shown in FIGS. 1 and 2.

The benefit of the present invention is that very few parts are used to accomplish both the insertion of the wrap material into the bale forming chamber and the cutting of the wrap material when the wrapping action is complete. To a large extent this is possible because of the direct linkage of the piston powering the wrap dispensing and cutting assemblies to the sledge rollers carrying arms. This linkage maintains the spacing and positions of the activating piston and the wrap dispensing and cutting assemblies relative to the moving sledge rollers, so that complex mechanisms are not required to activate the dispensing and cutting assemblies. The very simple structure of the invention yields economies in both original manufacture and maintenance of round balers upon which the invention is used.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, the invention can be used with various types of bale wrapping materials, such as net or plastic film. Furthermore, floating cam arm 48 is not limited to the shape shown in the drawings.

What is claimed as new and for which Letters Patent of the United States are desired to be secured is:

1. A wrap material dispensing and cutting apparatus for a crop bale wrapping machine that includes an expandable bale chamber with one boundary of the chamber formed by a sledge assembly with a plurality of sledge rollers comprising:

roll carrying arms pivotally mounted on a main frame of a crop bale wrapping machine, and supporting a plurality of sledge rollers oriented transversely across the main frame of the bale wrapping machine, so that the sledge rollers pivot with the roll carrying arms, and expand a bale chamber, for which the sledge rollers form one boundary, as a crop bale within the chamber increases in size;

a floating cam arm attached to the main frame at a first pivot point so that the floating cam arm moves in an arc in a plane parallel to the pivoting movement of the sledge rollers;

an activating piston with an extensible end and with a second pivot point attached to the extensible end, the piston mounted upon the floating cam arm in an orientation such that the extensible end moves in a linear path toward the first pivot point;

a wrap material dispenser arm oriented transverse to the path of the extensible end of the piston, with a central point of the wrap material dispenser arm pivotally attached to the extensible end at the second pivot point, a wrap material dispenser attached at a location on the wrap dispenser arm on a first side of the wrap dispenser arm, and a third pivot point located on a second side of the wrap material dispenser arm that is across the second pivot point from the wrap material dispenser, with the third pivot point attached to a roll carrying arm;

a knife arm pivotally attached to the floating cam arm at a fourth pivot point that is offset from the path of the extensible end of the piston and is on the side of the path of the extensible end opposite from the sledge rollers, with a first end of the knife arm extending toward the sledge rollers;

a wrap material cutting knife attached to the first end of the knife arm with a cutting edge on the side of the knife facing the wrap material dispenser; and a knife link connecting the second pivot point on the extensible end of the piston to a fifth pivot point located on the knife arm between the fourth pivot point and the wrap material cutting knife.

2. A wrap material dispensing and cutting apparatus for a crop bale wrapping machine that includes an expandable bale chamber with one boundary of the chamber formed by a sledge assembly with a plurality of sledge rollers comprising:

roll carrying arms pivotally mounted on a main frame of a crop bale wrapping machine, and supporting a plurality of sledge rollers oriented transversely across the main frame of the bale wrapping machine, so that the sledge rollers pivot with the roll carrying arms, and expand a bale chamber, for which the sledge rollers form one boundary, as a crop bale within the chamber increases in size;

a wrap material dispensing assembly that inserts a dispenser for wrap material between the sledge rollers and also withdraws the dispenser, with the wrap material dispensing assembly linked to and moving with the sledge rollers;

a wrap material cutting assembly that cuts wrap material at a location between the dispenser and a wrapped crop bale, With the wrap material cutting assembly linked to and moving with the sledge rollers; and.

a motive apparatus linked to the wrap material dispensing and cutting assemblies and providing motive power for the actions of the assemblies, with the motive apparatus linked to and moving with the sledge rollers.

* * * * *